United States Patent [19]

Combastet

[11] Patent Number: 4,916,975
[45] Date of Patent: Apr. 17, 1990

[54] SYSTEM FOR THE CONTROL OF THE OUTPUT SPEED OF A TORQUE CONVERTER WITH TWO DIFFERENTIALS

[76] Inventor: M. Michel Combastet, 25, rue du Faubourg Saint-Honore, 75008 Paris, France

[21] Appl. No.: 208,749

[22] Filed: Jun. 20, 1988

Related U.S. Application Data

[63] Continuation-in-part of Ser. No. 38,156, Apr. 14, 1987, Pat. No. 4,800,778.

[30] Foreign Application Priority Data

Apr. 24, 1986 [FR] France .................. 86 05958
Jun. 22, 1987 [FR] France .................. 87 08711

[51] Int. Cl.$^4$ ............................................. F16H 37/06
[52] U.S. Cl. .................................... 475/111; 475/208; 475/218; 475/219; 475/268; 475/330
[58] Field of Search .................. 74/682, 705, 752 F

[56] References Cited

U.S. PATENT DOCUMENTS

| | | | |
|---|---|---|---|
| 2,480,032 | 8/1949 | Kochis | 74/682 |
| 2,895,348 | 7/1959 | Beachler | 74/705 X |
| 2,973,669 | 3/1961 | Quigley | 74/682 X |
| 3,094,967 | 6/1963 | Willis, Jr. | 74/682 X |
| 3,242,769 | 3/1966 | Johnson | 74/682 |
| 3,318,172 | 5/1967 | Cummins | 74/682 |
| 3,645,152 | 2/1972 | Olcer | 74/682 |
| 4,077,278 | 3/1978 | Combastet | 74/682 |
| 4,109,551 | 8/1978 | Nemec | 74/705 |
| 4,327,604 | 5/1982 | Evans | 74/682 X |
| 4,800,778 | 1/1989 | Canbastet | 74/682 |

FOREIGN PATENT DOCUMENTS

| | | |
|---|---|---|
| 620738 | 11/1962 | Belgium . |
| 2327454 | 5/1977 | France . |
| 2450385 | 9/1980 | France . |
| 123201 | 11/1927 | Switzerland . |
| 191391 | 8/1937 | Switzerland . |
| 473677 | 11/1937 | United Kingdom . |

*Primary Examiner*—Dirk Wright
*Attorney, Agent, or Firm*—Sandler & Greenblum

[57] ABSTRACT

A torque converter system is provided with two differential gears, the cage of the first differential gear receiving the power from the engine motion input shaft and the output shaft of the second differential gear cage driving the system output shaft. The two differential gears have their four planetaries coupled two by two, wherein:

the engine motion input shaft and the system power output shaft are coaxial;

the motion is transmitted through each differential gear by planetary shafts which are coaxial to each other and coaxial to the shaft respectively connected to the input cage and the output cage, a mechanism is provided for the staging of fixed ratios between the rotation speeds at the input and the output; a rotation of the converter system output shaft in one direction and in the other; a disconnection of the output shaft in order to obtain a dead point, and the blocking of the output shaft rotation. One of four coupling wheels which serve couple the two differentials, can be provided with a mechanism for modifying the moment of inertia of the wheel.

19 Claims, 7 Drawing Sheets

SYSTEM FOR THE CONTROL OF THE OUTPUT SPEED OF A TORQUE CONVERTER WITH TWO DIFFERENTIALS

BACKGROUND OF THE INVENTION

Cross Reference to Related Application

This application is a continuation-in-part of copending patent application, Ser. No. 07/0938,156, filed Apr. 14, 1987, now U.S. Pat. No. 4,800,778 the disclosure of which is herein incorporated by reference.

1. Field of the Invention

The present invention relates to a mechanical torque converter system.

2. Brief Description of the Prior Art

Over the past forty years, torque converters for replacing the standard gear boxes with sets of gears have been studied. Indeed, the advantage of the torque converters is that they use to the maximum the performance of an engine by maintaining said engine longer at the speed for which it provides its maximum torque. Presently, there exist hydraulic and mechanical torque converters.

The owner of the present invention has ben led to study some years ago a simple and robust torque converter, or reasonable cost price and easy to maintain. Such a mechanical torque converter is disclosed in French patent No. 75-31-066, published under No. 2-327-454 and in the certificate of addition No. 79-05-143 published under No. 2-450-385, and in U.S. Pat. No. 4,077,278, the disclosure of which is herein incorporated by reference.

The torque converter according to this prior technique acts via a differential retroaction and is made of two differential gears; the cate, at the inlet of the first differential gear, receives the power to be transmitted, and the cage at the outlet of the second differential gear drives the receiving member, the two differential gears having their shafts driven by the planetaries coupled two-by-two on the same side by two trains of gears.

In the hereabovementioned patents, no particular measure has been described as regards to the forecasting and the control of the effective variations of the effective input and output speed ratios.

SUMMARY OF THE INVENTION

The present invention aims at providing improvements to this type of converter so as to obtain a continuous torque variation, without slippage, and the control of a staging of fixed ratios.

The torque converter system includes an input differential gear and an output differential gear. The input differential has an input cage for receiving power from an engine motion input shaft. The output cage of the output differential gear has an output shaft for driving a system output shaft. Each of the differential gears have four planetary shafts coupled two-by-two. The system output shaft is coaxial with the engine motion input shaft, and motion is transmitted through each of the differential gears by planetary shafts which are coaxial to each other and coaxial to a shaft connected, respectively, to the input cage and the output cage. The motion of the planetary shafts are output on the same side, opposite each shaft which is connected to each said cage. The torque converter system includes a mechanism for obtaining a staging of fixed ratios between rotation speeds of the output shaft and a mechanism for rotating the system output shaft in either of two directions. Additionally, a mechanism is provided for disconnecting the system output shaft in order to obtain a dead point, and a mechanism if provided for blocking rotation of the system output shaft.

A coupling device is provided for directly connecting the input shaft and the power output shaft and a disconnect mechanism is provided for disconnecting the connection between the output shaft and the input differential gear or the output differential gear. The coupling device can include a mechanism for simultaneously directly connecting the input shaft and the output shaft and disconnecting the input and output differential gears. The coupling means can be a mechanical clutch, a hydraulic clutch, or an electromagnetic clutch. Additionally, the coupling means can be manually controlled by means of a mechanism which includes a sliding gear on a fluted shaft, actuated by a control fork.

The output differential gear's output shaft can be connected to the system output shaft, by means of a set of gears and a stage control so as to produce the staging of fixed ratios between the rotation speeds at the input and at the output, the rotation of the output shaft in either of two directions, a dead point or the blocking of the mechanism. Two planetary shafts of the input differential gear are respectively connected to two planetary shafts of the output differential gear, through gears of predetermined reduction.

Each of the differential gears include four planetary gears coupled two-by-two and four coupling wheels which serve couple the two differentials. At least one of the coupling wheels can be provided with a mechanism for modifying the moment of inertia of the wheel. The four coupling wheels include an overdrive wheel and a reduction wheel, and the inertia can serve to decrease the inertia moment of said overdrive wheel relative to the moment of inertia of the reduction wheel.

The desired moment of inertia for the reduction wheel of the input differential can be acheived through the use of a thin web throughout the greater portion of the web, or spokes can be used to provide the desired moment of inertia. A modification of the effective weight of a reduction wheel of the input differential gear can be obtained by coupling said reduction wheel to a flywheel or uncoupling the wheel from the flywheel.

The flywheel can have a hollow web and a liquid in said hollow web. The liquid can be forced outwardly by centrifugal force, thereby modifying the moment of inertia of said inertia flywheel or a pressuring mechanism and valves can be used for controlling the pressurized distribution of the liquid within the hollow flywheel.

A motor can be coupled to a coupling wheel of the input differential gear for increasing the speed of the coupling wheel thus decreasing the effective weight of the coupling wheel. Additionally, or alternatively, a brake can be positioned to engage a coupling wheel of the input differential gear, thus increasing the effective weight of the coupling wheel.

BRIEF DESCRIPTION OF THE DRAWING

Other features and advantages of the invention will become more apparent from the hereafter description with reference to the accompanying drawing which illustrates two embodiments thereof, without any limiting character.

In the drawing.

DETAILED DESCRIPTION OF THE INVENTION

Figure 1:
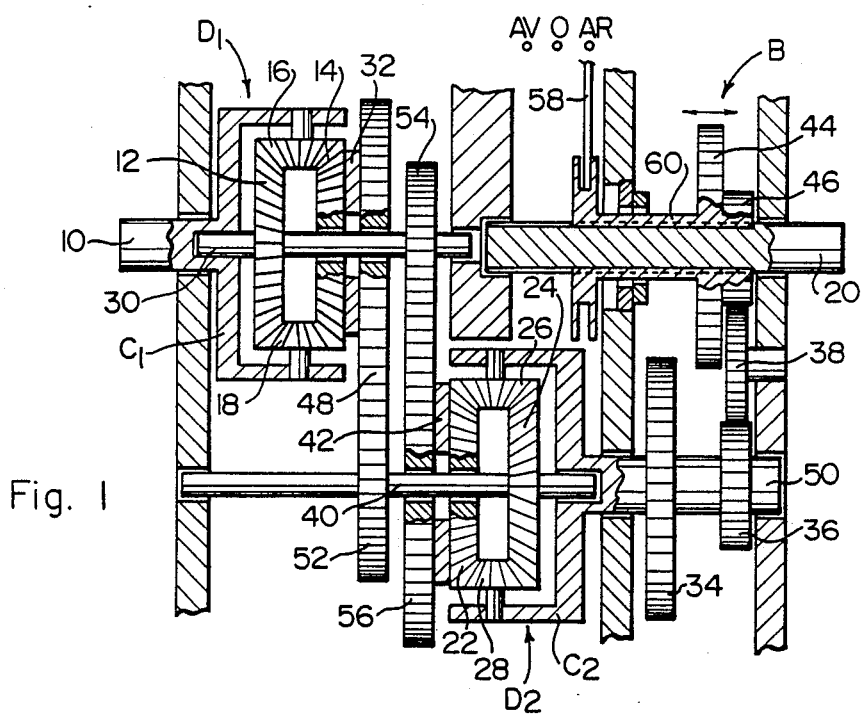
FIG. 1 is a schematic view, partly in section, of a first embodiment of the invention.

The present invention aims at providing improvements to the mechanical torque converter system so as to obtain a continuous torque variation, without slippage, and the control of a staging of fixed ratios.

The torque converter system acts by a continuous differential retroaction and a staging of fixed ratios. Two differential gears, the cage of the first differential gear receiving the power from the engine motion input shaft and the output shaft of the second differential cage driving the system output shaft, have four planetary gears coupled two-by-two, and can be characterized as follows:

the engine motion input shaft and the system power output shaft are coaxial;

the motion is transmitted through each differential gear by planetary shafts which are coaxial to each other and coaxial to the two connected shafts, respectively, one of the input cage and the other of the output cage, so that the motions of the planetaries ar output on the same side, opposite each shaft which is connected to each cage; and the system includes a device which provides for a staging of fixed ratios between the rotation speeds at the input and the output; a rotation of the converter system output shaft in one direction and in the other: a disconnection of the output shaft in order to obtain a dead point, and the blocking of the output shaft rotation.

The torque converter system provides a direct connection between the engine motion input shaft and the system power output shaft. To this effect, a mechanism is provided for connecting on the one hand the input shaft, the central planetary shaft and the power output shaft, and on the other hand for disconnecting the two differential gears.

According to an embodiment of the invention, the direct connection between the system input shaft and output shaft is provided on the one hand by connecting the two differential planataries with the power output shaft and on the other hand by disconnecting simultaneously the two differential gears.

According to another feature of this invention, the connection between the shaft connected to the output cage of the second differential gear, or output differential gear, and the system power output shaft, coaxial to the motion input shaft, can be provided via one or several sets of gears, with a stage control, so as to obtain the staging of fixed ratios between the rotation speeds at the input and at the output, the rotation of the output shaft in one direction and in the other, said dead point and the blocking.

According to another feature of this invention, the two planetary shafts of the first differential gear, or input differential gear, are respectively connected to the two planetary shafts of the second differential gear via two appropriate reduction gears.

With reference to the drawing, one sees that the torque converter according to the invention is substantially made of a torque variator with continuous variation without slippage, comprised of two differential gears, $D_1$ and $D_2$, respectively called input differential gear and output differential gear, coupled to each other as will be seen hereafter via reduction gears and of devices for staging fixed ratios, the reversal, a dead point and the blocking of the output shaft rotation, shown generally by reference B.

As shown in the drawing, each differential gear $D_1$ and $D_2$ is characterized by the singleness of the axis of the motion input and output members, viz. the cage and the two planetaries. Cage $C_1$ of the input differential gear $D_1$ is in relation with the outer motion via the motion input shaft 10, which is rigidly connected thereto. The cage $C_1$ carries, as known, satellites 16, 18, and the planetaries 12, 14 of the input differential gear ar mounted on planetary shafts 30, 32 concentrical and coaxial, arranged so that their motion is output from the side opposite to shaft 10 which is rigidly connected to cage $C_1$.

The arrangement is the same as regards the output differential gear $D_2$. Its cage $C_2$ is rigidly connected to the motion output shaft 50 and it carries, as known, the satellites 26, 28. The planetaries 22, 24 of the output differential gear $D_2$ are mounted on planetary shafts 40, 42, concentrical and coaxial, arranged so that their motions are input from the side opposite the output shaft 50.

The two planetary shafts 30, 32 of the input differential gear $D_1$ are respectively connected to the two planetary shafts 40, 42 of the output differential gear $D_2$ via gears 48, 52, 54, 56 of determined demultiplication.

According to an essential feature of this invention, the motion input shaft 10 is coaxial to the torque converter system power output shaft 20. To this effect, the motion output shaft 50 of output differential gear $D_2$ is provided with two gears 34, 36 which can respectively mesh with gears 44, 46 keyed into the power output shaft 20, in alignment with the input shaft 10. A reversal shaft for the rotation direction 38 is interposed between gears 46 and 36.

The device B, comprised of gears 34, 36, 38, 44, 46, allows therefore performing the four following functions:

a staging of fixed ratios between the rotations speeds at the input and the output;

a rotation of the converter system output shaft 20 in one direction or in the other: to this end, gears 44, 46 are mounted on a fluted shaft 60, which can move along shaft 20 under the control of a manual device such as a fork 58, or any other appropriate means such as mechanical, electrical, electromagnetical, pneumatic, hydraulic or electronic control;

the disconnection of the output shaft 20 so as to obtain a dead point;

the blocking of the rotation of the power output shaft 20.

Electrical, electromagnetical, pneumatic, hydraulic and electronic controls, are well known in the art and the specifics of such systems are not a part of the instant invention.

The converter according to the invention provides a direct connection between the input shaft 10 and the power output shaft 20. To this effect, a mechanism is provided for:

On the one hand connecting the input shaft 10, the planetary shaft 30 of the input differential gear D₁ and the power output shaft 20;

on the other hand, disconnecting the connection between the two differential gears D₂.

Said means can be provided in the form of a mechanical, electromagnetic or hydraulic clutch, with discs or claws, or via a gear slipping mechanism.

Figure 2:
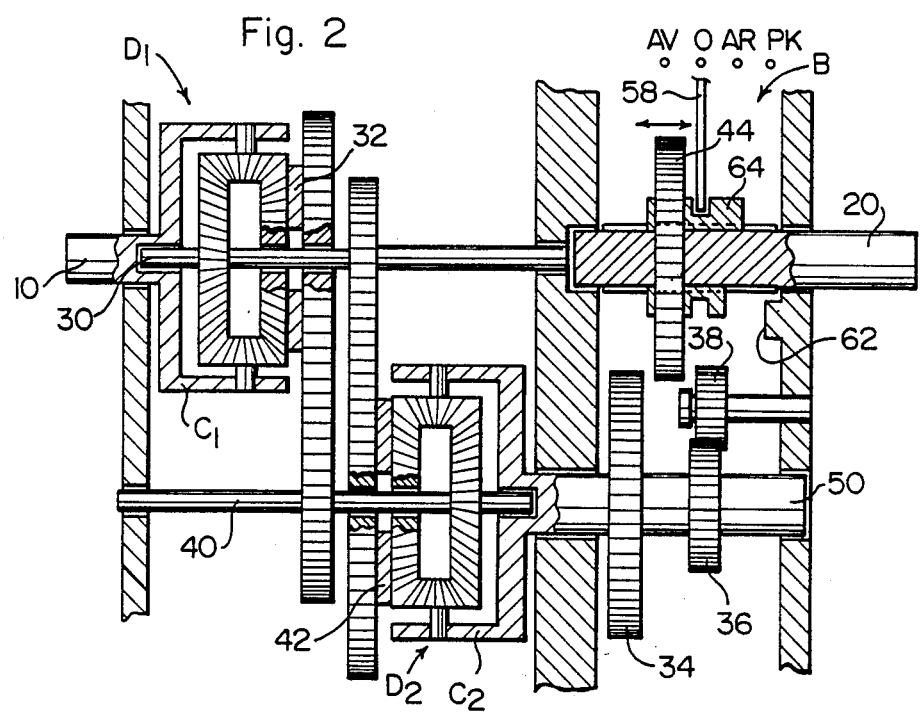
FIG. 2 is a schematic illustration, partly in section, of another embodiment of the invention.

The embodiment shown in FIG. 2 is different from the embodiment shown in FIG. 1 only as regards the way casing B is made, and by the fact that the reversal gear 38 is offcenter with respect to gears 34, 36 and 44. The blocking of the rotation of the power output shaft 20 is provided by two protrusions 62, 64, when said protrusions are in engagement against each other.

One will understand from the reading of the foregoing disclosure that the torque converter according to the invention allows obtaining normal rotation direction of the power output shaft 20 identical to that of the motion input shaft 10, and providing a motion in the reverse direction, or reverse motion, more or less geared down, by a continuous variation or stepwise.

Figure 3:
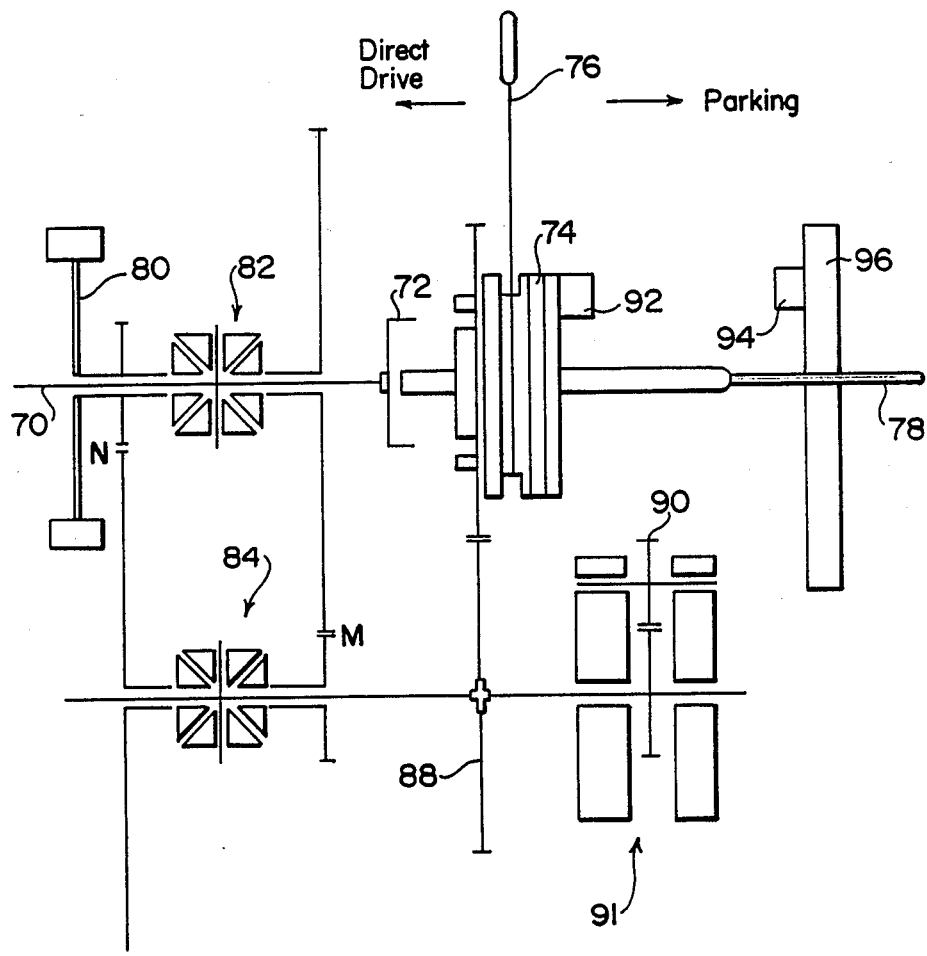
FIG. 3 is a schematic illustration, partly in section, of a torque converter with a mechanical control mechanism for providing a direct drive connection.

FIG. 3 illustrates a torque converter having a mechanical control mechanism which can shift between a direct drive position and a parking position. The drive force is applied to shaft 70 and is transmitted to the output shaft 78, when the direct connection position, the wheel 86, of the control member 74, is out of engagement with the wheel 88.

Figure 15:
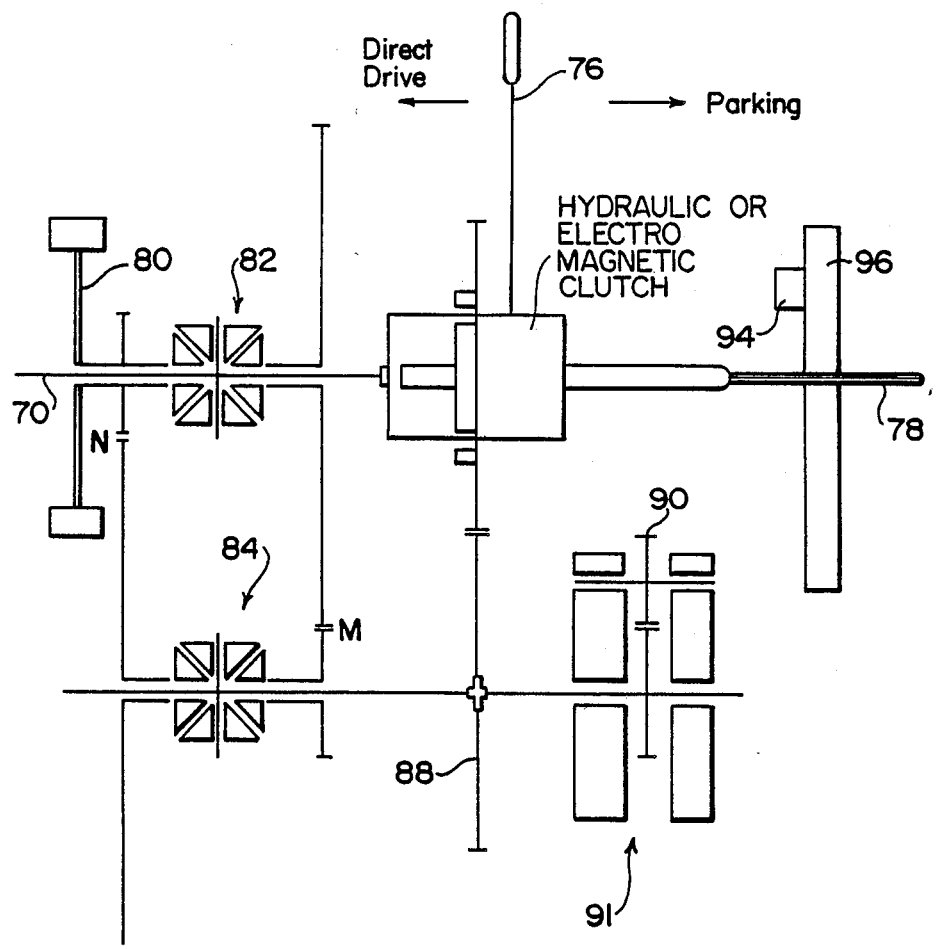
FIG. 15 is a schematic illustration of a mechanical torque converter which shows a clutch which may be hydraulic or electromagnetic.

The shifting of the position of the control member 74 is effected through the movement of the shift lever 76. When the control member 74 is in the position shown in FIG. 3, the input driving force is transmitted through the input differential 82 to the output differential 84 to wheel 88, and to control member 74, by means of the control member wheel 86. As illustrated in FIG. 15, the control member 74 maybe a hydraulic clutch or an electromagnetic clutch.

When the control member is moved, by means of lever 76, to the position in which rear inversion wheel 90 engages the control member wheel 86, the output from the output shaft 78 is in the reverse direction from the direction of rotation of input shaft 70. The control member 74 can be positioned such that the wheel 86 is out of engagement with the connection member 72, as well as wheel 88 and wheel 90, in which case the control is in the dead point position.

Parking of the control mechanism is achieved by engaging projection 92, of the control member 74, and a corresponding projection 94 on the output shaft support member 96.

It is thus seen that control member 74 can be shifted through a series of positions as follows:

1. a first position in which a direct drive connection is made from input shaft 70 to output shaft 78;
2. a second position in which the input force is transmitted through the differentials, to output shaft 78;
3. a third position in which output shaft 78 is isolated from input shaft 70;
4. a fourth position in which the direction of rotation of the input force is transmitted through inversion mechanism 91 and the direction of rotation of output shaft 78 is the reverse of the direction of rotation of input shaft 70; and
5. a fifth position in which the control mechanism is fixed in a parking position.

Figure 12:
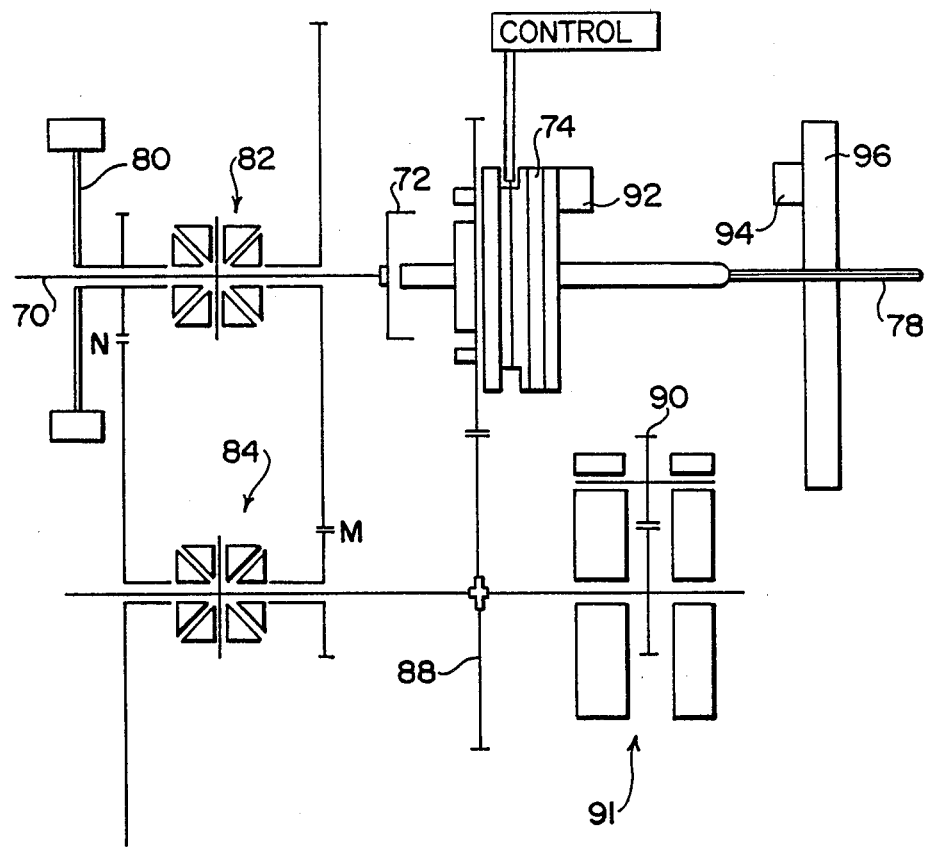
FIG. 12 is a schematic illustration, partly in section, of a torque converter with a control mechanism for changing the drive connection.
Figure 13:
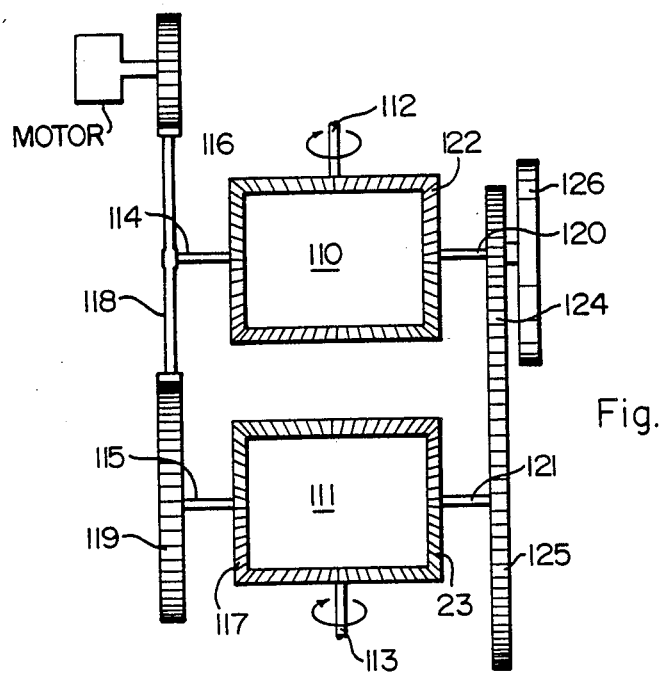
FIG. 13 is a schematic illustration of a mechanical torque converter which includes a motor.
Figure 14:
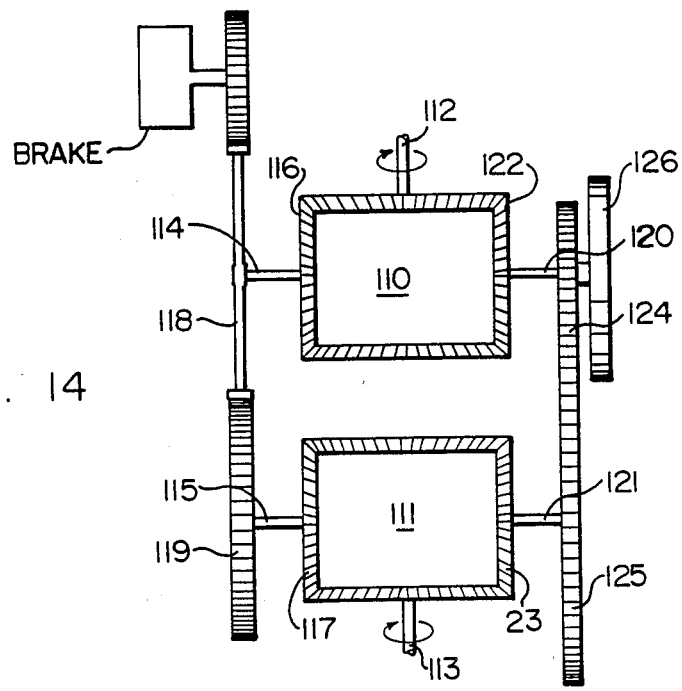
FIG. 14 is a schematic illustration of a mechanical torque converter which includes a break.

The control mechanism can also be actuated by other means such as, electrical, electromechanical, pneumatic, hydraulic or electronic control actuation devices, as illustrated in FIG. 12.

The present invention also aims at providing improvements to such mechanical torque converters acting through a differential retroaction and relates to the calculating of the maximum output value of such a converter and the method of operating a control system for such a converter.

In such a mechanical torque converter, the design parameters can provide for a well-determined field of speed ratios and of acceleration conditions thus permitting designing and executing a converter which is particularly well adapted to the chosen application. Indeed, a converter made of the combination of two differentials, in accordance with the measures described in the hereabovementioned patents but not having the control mechanism of the present invention are operative, but the field of its performance is substantially reduced as regards to the transmitted power as well as the interval separating the extreme speed and acceleration ratios obtained.

When a mechanical torque converter with differentials is made according to the hereabovementioned patents, the converter providing the connections between the associated differentials are made without any constraints other than those consisting in the definition of the modules and in the determination of the materials necessary for the sturdiness of the transmission system made.

In order to obtain the performance sought out and hereabovementioned, experience shows that it is necessary to provide a control device for controlling the dynamic reactions of the group of intermediate pinions or gear wheels, viz. the side gears and the drive pinions of the system. In accordance with the instant invention, the control device is based on the principle of determining the relative moments of inertia of the pinions or homologous gear wheels of the intermediate group and more particularly, the side gears and the gears of the power input differential, in order to attain the maximum output speed, compatible with a determined output power.

In order to better understand the improvements of the instant invention, the way a converter, such as disclosed in aforementioned patents, is made should first be recalled.

References 110 and 111 designate the two differentials. The mechanical converter of FIG. 4 includes an input differential 110 and an output differential 111. The input shaft 112, which is rigidly connected to the cage of the first differential 110 receives the power to be transmitted, and the output shaft 113 which is rigidly connected to the cage of the second differential 111 drives the receiving member. Shafts 114 and 115, respectively driven by the side gears 116 and 117 of the first and second differentials, are coupled via two gears or trains of gears 118 and 119 having between themselves a determined overdrive ratio M. Shafts 120 and 121 of side gears 122 and 123, of respectively, the differentials 110 and 111, are coupled via two gears or trains of gears 124 and 125 having also a determined reduction ratio N and such as N<M.

During the operation of the converter, the input shaft 112 receives the power to be transmitted (speed $V_E$, torque $C_E$), and the two differentials, thus coupled, balance the torque $C_S$ and the speed $V_S$ on the output shaft 113 so as to overcome the resisting torque of the receiving member. The result is a variation of speed $V_S$ conjugated with a variation in the reverse direction of torque $C_S$ without a variation of the input speed $V_E$ and of the input torque $C_E$, verifying the necessary relation:

$$V_S \times C_S = V_E \times C_E$$

It will be appreciated that the movement of the two side gears 116 and 117 will dynamically balance each other when the two forces of the torque are equal. The two forces of the torque are noted to act at the points of contact of the driving pinion, which is rigidly connected to shaft 112, with the side gear 116, and with respect to side gear 117, at point of contact with the driven pinion, which is rigidly connected to the output shaft 113. In this case, and only in this case, the two rotation speeds of the wheels of the reducer are constant and, simultaneously, either the side gear does not rotate or it is driven at a constant speed.

The forces of the motive torque which are applied to the side gear paths 116-117 and 122-123 impart to each of the paths, an acceleration which enables each side gear assembly to reach a certain speed depending on the one hand on the resisting load on the output shaft and on the other hand on the inertia of its side gear wheel, of its shaft and of its reduction wheel which is also rigidly connected to the side gear shaft. Finally, one has also to take in account the inertia of any wheel or mass driven downstream of the same side gear, so as to calculate the balance of the required speeds.

It is known that the weight of the standard wheel is substantially proportional to the third power of their diameter, in a predetermined series. In such a case, it is obvious that the mounting of the reduction wheels, which provides for the connection between the two differentials 110 and 111 is such that the large diameter wheel 118 (large ratio M), or overdrive wheel, situated on the side which is usually called the speed path of the system is heavier than the wheel of smaller diameter 124 or reduction wheel, situated on the shaft of the side gear 122 forming what is usually called the torque path side (small ratio N). Consequently, the inertia of the wheel 124, which is on the torque path side, is smaller than the inertia of the wheel 118 situated on the speed path side and wheel 124, which is subjected to the motive moment, will be subjected to a larger acceleration than that to which the heavy wheel 118 is subjected.

The dynamic theory of such a differential converter shows that the largest possible output speed is obtained when the output resisting load is zero and when the two side gears of the input differential 110 rotate at the same speed as the cage of said input differential. Since the output speed resulting from the distribution of the input movement is relatively small and can even be very close to the minimum theoretical speed, such a converter will lose the largest portion of its theoretical performance field.

Thus, when the speed ratio reaches a certain value, the forces of the motive torque on the drive pinion balance themselves and the two side gears 116 and 117 rotate at a constant speed. Since the distribution of the speeds results from the inertia of the intermediate wheels, it is sufficient to calculate the ratio of the weights of each pair of homologous wheels in such a way that their moments of inertia engender the operation of the desired inertia.

As a guide, the calculation procedure comprises the following steps:

(1) the determination of the acceleration of the large and small wheels in their natural state for a known impulse;

(2) the determination of the weight decrease of the large wheel and the weight increase of the small wheel to arrive at equality of the moments of inertia;

(3) the experiment determination of the losses of operation under load, due to friction, and the deduction the complement (positive or negative) of the inertia moment of each wheel;

(4) a determination of the weight decrease, and the weight increase, allowing on one hand for losses through friction and on he other hand complement of the acceleration conferred to the large wheel in order that the relation of input and output speeds have a tendency to approach the nominal output speed $V_S$ when the input torque and the output torque are equal, or approximately equal, such that $$V_S = V_E \times M + N/2$$

$V_E$, being the input speed, M being the ratio of overdrive and N being the scaling ratio.

It is taken into account for the adjustment of the parameters of the desired acceleration (i.e., the change of speed per unit of time). Thus, suitable moments of inertia are obtained allowing the generation of the dynamics and balance of desired speeds.

Therefore, the present invention relates to a mechanical converter system acting by differential retroaction, including two associated differentials, the cage of the first differential receiving the power from the input shaft of the motive movement and the output shaft of the cage of the second differential driving the system output shaft, the two differentials having their four side gears coupled two by two, this torque converter system being characterized by means modifying the natural ratio of the side gear inertia moments and of the four coupling wheels, in the sense that the wheel's inertia moment, assuring the reduction of ratio N of the side gear group on the torque path side, is increased and simultaneously, the inertia moment of the overdrive wheel of ratio M of the side gear group, on the speed path side, is decreased, by means of reversing the ratio of the moments of inertia of the overdrive wheel and of the reduction wheel, which allows for the control and the law of automatic equilibrium of the desired speeds and accelerations, under the effect of a known impulse.

According to the invention, the weight of the wheels of such side gears can be adjusted either by a reduction of weight, or by an increase in weight, or through the use of an inertia wheel, connected to side gear shafts, or again by a simulation of an inertia effect with a view to obtaining the desired inertia moments.

Figure 4:
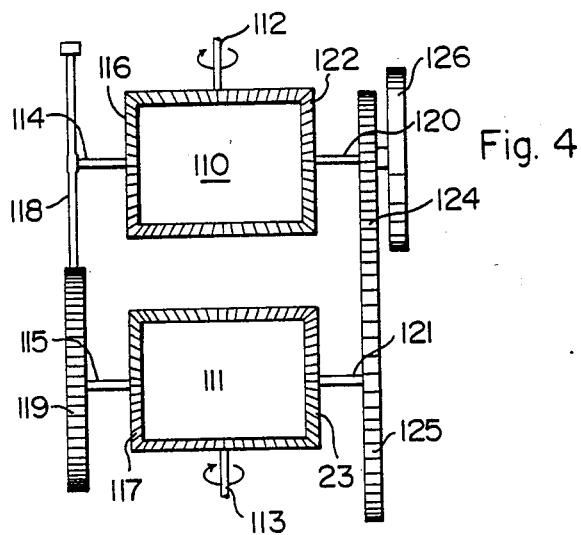
FIG. 4 is a schematic illustration of a mechanical torque converter which includes an inertia wheel.
Figure 5:
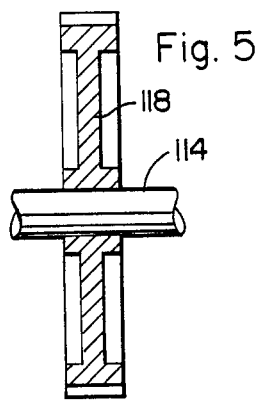
FIG. 5 is a schematic illustration, partly in section, of a wheel of the side gears of the input differential of the converter of FIG. 4.
Figure 6:
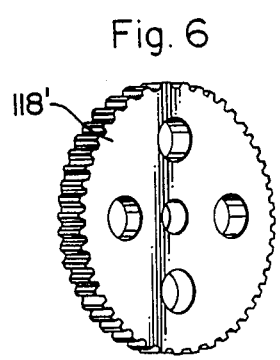
FIG. 6 is a perspective view of a large wheel for use with the speed side gear group of the input differential of the converter of FIG. 4.
Figure 7:
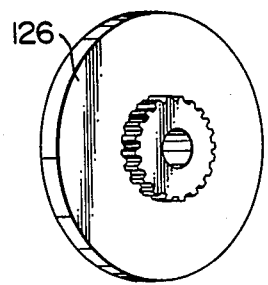
FIG. 7 is a perspective view of an inertia flywheel assembly for use with the input differential of the converter of FIG. 4.

As can be seen in FIG. 4, the large reduction wheel 118 of the side gear groups situated on the speed side of the input differential 10 has been made lighter by thinning out the largest portion of its web. Wheel 118 is shown in vertical section and at a larger scale in FIG. 5. In this same embodiment of the invention illustrated in FIG. 4, the small reduction wheel 124 of the side gear group of this input differential 110 is attached to a flywheel 126 which allows obtaining the extra inertia moment determined by the calculation through its shape and the choice of the materials. The small wheel 124 and inertia flywheel 126 assembly is shown at a larger scale and in perspective in FIG. 7.

Of course, one can employ other methods of determining the weight of each wheel and obtaining the weight, with a view to reaching the inertia moments, allowing generating the desired speed balance.

Figure 8:
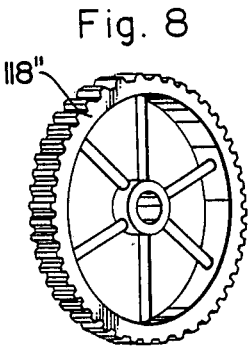
FIG. 8 is a perspective view of another embodiment of a large wheel for use with the speed side gear group of the input differential of the converter of FIG. 4.

The large wheel 118, of the speed side gear group, is made light in weight through the use of holes formed in its web. In the embodiment of FIG. 8, the reduction in weight of the large wheel 118' has been obtained through the pinion with spokes.

Figure 10:
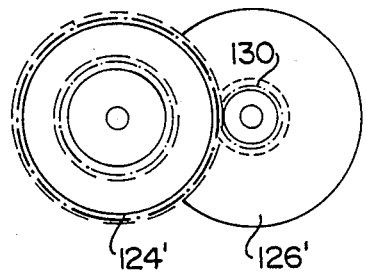
FIG. 10 is a schematic illustration of a coupling mechanism for an inertia flywheel assembly.

With respect to increasing the weight of the small wheel 124 of the torque side gear group, the weight increase can be effected by means of a flywheel provided with a coupling and uncoupling mechanism on the small wheel. The coupling and uncoupling mechanism can be of the mechanical, hydraulic or electromagnetic type. In the embodiment shown in FIG. 10, there has been provided an extra gear 130 in mesh with the small reduction Wheel 124' (on the torque path side), the two pinions have a determined ratio and rotating inertia flywheel 126 provides for the regulation of the balance.

Figure 9:
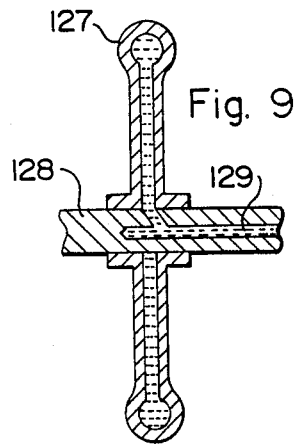
FIG. 9 is a fragmentary, vertical cross-sectional view of a hollow flywheel with a fluid passage.

In the embodiment shown in FIG. 9, which illustrates a vertical sectional view of a flywheel which has to be associated with the small reduction wheel 124 (FIG. 4), flywheel 127 is made in the form of a hollow web which can contain a liquid, such as water, oil, mercury, and the like. The liquid is delivered via feeding duct 129, which is positioned along the axis of rotation of shaft 128, and provides for the modification of the inertia effect of the resultant flywheel, either naturally through the action of the centrifugal force driving the liquid toward the outside, or via valves controlling the distribution of the fluid under pressure admitted in hollow flywheel 127.

Figure 11:
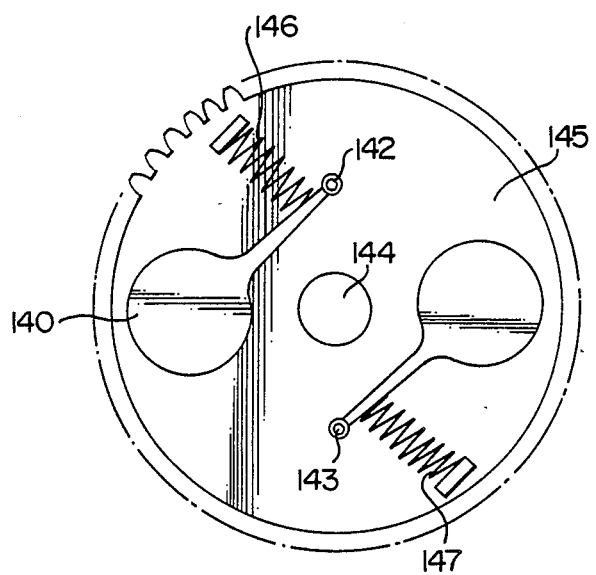
FIG. 11 is a schematic illustration of a flywheel having flyweights for modifying the moment of inertia.

The inertia moment of a side gear wheel can be modified by the radial displacement of fly-weights, as illustrated in FIG. 11, articulated on rotation axes 142 and 143 which are rigidly connected to the side gear shaft 144 via a support disk 145. The return to the center can be ensured for example by the use of return springs 146 and 147.

It is possible to employ other systems for modifying the moment of inertia of the large wheel 118 and of the small wheel 124. For example, a motor can be used for increasing the speed of the large wheel 118 on the speed side, thus simulating a wheel which is reduced in weight, while a brake can be used for slowing down the speed of the small wheel 124 on the torque side, so as to simulate a wheel which is increased in weight.

The possible applications of the torque converter according to this invention are notably the following: motion transmission in machine-tools; transmission of torques in vehicles, or land, sea or air transport means, lifting, handling or boring apparatus, etc., for providing servomechanisms and micromechanisms, torque limiting apparatus, coupling of energy production groups.

Obviously, this invention is not limited to the various embodiments shown and described, and it encompasses all their variants.

What is claimed is

1. A torque converter system comprising a first differential gear and a second differential gear, said first differential gear and said second differential gear each being provided with a cage, wherein the cage of the first differential gear is an input cage for receiving power from an engine motion input shaft and said cage of said second differential gear is an output cage, said second differential gear being provided with an output shaft for driving a system output shaft, said first differential gear and said second differential gear having four planetary shafts coupled two-by-two, wherein the system output shaft is coaxial with the engine motion input shaft whereby motion is transmitted through each said differential gear by planetary shafts which were coaxial to each other and coaxial to a shaft connected, respectively, to the input cage and the output cage, whereby the motion of the planetary shafts are output on the same side, opposite each shaft which is connected to each said cage; said torque converter system further comprising means for obtaining a staging of fixed ratios between rotation speeds of the output shaft; means for rotating the system output shaft in one direction and in another direction; coupling means for directly connecting the input shaft and the power output shaft and disconnect means for disconnecting the connection between at least one of said first differential gears and said second differential gears and said output shaft; and means for disconnecting the system output shaft in order to obtain a deadpoint, and means for blocking rotation of the system output shaft.

2. A torque converter system according to claim 1, wherein said coupling means are directly connecting said input shaft and said output shaft includes means for connecting said input differential gear with the output shaft and for simultaneously disconnecting said first differential gear and said second differential gear.

3. A torque converter system according to claim 1, wherein said coupling means is a mechanical clutch.

4. A torque converter system according to claim 1, wherein said coupling means is a hydraulic clutch.

5. A torque converter system according to claim 1 wherein said coupling means in an electromagnetic clutch.

6. A torque converter system according to claim 1, wherein said coupling means is manually controlled and includes a sliding gear on a fluted shaft, actuated by a control fork.

7. A torque converter system according to claim 1, further comprising means for connecting said second differential gear output shaft and said system output shaft, said means including at least one set of gears and a stage control whereby the staging of fixed ratios between the rotation speeds at the input and at the output, the rotation of the output shaft in one direction and in the other, said dead point and said blocking is obtained.

8. A torque converter system according to claim 1, wherein two planetary shafts of said first differential gear are respectively connected to two planetary shafts of said second differential gear, through gears of predetermined reduction.

9. A mechanical torque converter system comprising: a first differential and a second differential, said first differential having a first cage for receiving a power of a input shaft of motive movement, said second differential having an output cage for driving an output shaft of said converter system, each of said first differential and said second differential having four planetary gears coupled two-by-two, for coupling wheel means for coupling said first differential and said second differential, inertia modifying means for decreasing the inertia moment of said overdrive wheel relative to the moment of inertia of said reduction wheel, wherein an increase in the effective weight of a reduction wheel of said first differential gear is obtained by coupling said reduction wheel to a fly wheel.

10. A torque converter system according to claim 9, wherein said reduction wheel of said input differential is thin throughout the greater portion of its web.

11. A torque converter system according to claim 9, wherein said overdrive wheel has holes in its web.

12. A torque converter system according to claim 10, wherein said reduction wheel has spokes.

13. A torque converter system according to claim 9, wherein the effective weight of a wheel is varied by coupling said wheel to a fly wheel and further comprising coupling means for coupling and uncoupling said wheel and said fly wheel.

14. A torque converter system according to claim 13, wherein said flywheel has a hollow web and a liquid in said hollow web.

15. A torque converter system according to claim 14, wherein said liquid is forced outward by centrifugal force, thereby modifying the moment of inertia of said inertia flywheel.

16. A torque converter system according to claim 14, wherein said gear group of the torque path side further comprises means for exerting pressure and valve means for controlling pressurized distribution of said liquid inside said hollow flywheel.

17. A torque converter system according to claim 9, wherein said inertia wheel includes at least one fly-weight whose movement changes the center of gravity of said fly-weight along a radial direction, whereby the moment of inertia of said fly wheel and said fly-weight is varied.

18. A torque converter system according to claim 9, further comprising a motor, said motor being coupled to a coupling wheel of said first differential gear for increasing the speed of said coupling wheel whereby the effective weight of said coupling wheel is decreased.

19. A torque converter system according to claim 9, further comprising means for braking, said means for braking being positioned to engage a coupling wheel of said first differential gear, whereby the effective weight of said coupling wheel is increased.

* * * * *